US009898895B2

(12) United States Patent
Moskowitz

(10) Patent No.: US 9,898,895 B2
(45) Date of Patent: Feb. 20, 2018

(54) METHODS, SYSTEMS, AND APPARATUS FOR PLAYING POKER, BLACKJACK AND BACCARAT

(71) Applicant: Ahmnon D. Moskowitz, Rockville, MD (US)

(72) Inventor: Ahmnon D. Moskowitz, Rockville, MD (US)

( * ) Notice: Subject to any disclaimer, the term of this patent is extended or adjusted under 35 U.S.C. 154(b) by 0 days.

(21) Appl. No.: 14/332,351

(22) Filed: Jul. 15, 2014

(65) Prior Publication Data

US 2015/0087374 A1 Mar. 26, 2015

Related U.S. Application Data

(60) Provisional application No. 61/846,608, filed on Jul. 15, 2013.

(51) Int. Cl.
*A63F 13/00* (2014.01)
*G07F 17/32* (2006.01)

(52) U.S. Cl.
CPC ...... *G07F 17/3293* (2013.01); *G07F 17/3262* (2013.01)

(58) Field of Classification Search
CPC .......... A63F 2001/001; A63F 2001/003; A63F 2001/005; G07F 17/3293; G07F 17/3262
USPC .......................................................... 463/12
See application file for complete search history.

(56) References Cited

U.S. PATENT DOCUMENTS 3,796,433 A 3/1974 Fraley et al.
4,339,134 A 7/1982 Macheel
4,380,334 A 4/1983 Minkoff et al.
5,154,429 A 10/1992 LeVasseur
5,257,789 A 11/1993 Levasseur
5,395,119 A * 3/1995 Jacob .................. A63F 3/00157 273/274
5,605,334 A 2/1997 McCrea, Jr.
5,791,991 A 8/1998 Small
5,823,873 A 10/1998 Moody
6,581,937 B1 6/2003 Crisswell
7,367,564 B2 5/2008 Latell
7,758,411 B2 7/2010 Crawford, III et al.
7,785,184 B2 * 8/2010 Jubinville ............... G07F 17/32 273/292
7,824,254 B2 11/2010 Dunaevsky et al.
9,286,747 B2 3/2016 Chang
9,552,701 B2 1/2017 Pececnik
2002/0111205 A1 8/2002 Beavers
2003/0027621 A1 2/2003 Libby
2004/0015529 A1 6/2004 Tanrikulu et al.
(Continued)

FOREIGN PATENT DOCUMENTS

WO 2004015529 A2 2/2004

OTHER PUBLICATIONS https://en.wikipedia.org/wiki/Catch_21.
https://play.google.com/store/apps/details?id=air.com.dif-ferencegames.towerof21free.
http://www.gsn.com/games/free/catch21/.

*Primary Examiner* — Allen Chan
(74) *Attorney, Agent, or Firm* — The Roy Gross Law Firm, LLC; Roy Gross

(57) ABSTRACT

A method, system, gaming apparatus for playing blackjack, poker and baccarat allowing players the option of pre-determining the starting variables from a plurality of starting wagering positions with payouts that substantially correspond with a starting selection or selections.

20 Claims, 13 Drawing Sheets

(56) References Cited

U.S. PATENT DOCUMENTS

| | | | | |
|---|---|---|---|---|
| 2004/0176155 | A1* | 9/2004 | Gold | G07F 17/32 463/13 |
| 2007/0120320 | A1* | 5/2007 | Miltenberger | A63F 5/00 273/143 R |
| 2007/0135203 | A1* | 6/2007 | Nicely | A63F 5/00 463/17 |
| 2008/0076572 | A1 | 3/2008 | Nguyen et al. | |
| 2009/0121434 | A1* | 5/2009 | Baerlocher | G07F 17/3276 273/292 |
| 2009/0295087 | A1 | 12/2009 | Kling et al. | |
| 2010/0078892 | A1 | 4/2010 | Gore | |
| 2010/0261515 | A1 | 10/2010 | Tobias et al. | |
| 2010/0298039 | A1 | 11/2010 | Dunaevsky et al. | |
| 2011/0057390 | A1* | 3/2011 | Scalisi | A63F 1/00 273/292 |
| 2011/0140359 | A1 | 6/2011 | Polynice | |
| 2013/0102381 | A1 | 4/2013 | Nelson et al. | |
| 2016/0379443 | A1 | 12/2016 | Abbott | |

* cited by examiner

| | | | | |
|---|---|---|---|---|
| Select House Hand | 17 | 18 | 19 | 20 |

1. How many zones

| 1 | 2 | 3 | 4 |
|---|---|---|---|

2. 18-21 or bust ☐ 21 or bust ☐ Combination bets 18-21/ 21 or bust ☐
*Two games equal two bets*

3 .Play compound blackjack *select only If more than one zone is* selected yes ☐ no ☐

If 18-21, or 21 is selected it is one additional bet if the combination is selected it is two additional bets, If a player selects option 3 *Combination bets 18-21/ 21 or bust* the amount of bets would be doubled . For example if player selects 3 zones for option 1 and yes for number 5 options the amount of bets would double to eight.

| | | | | | | | | | | | |
|---|---|---|---|---|---|---|---|---|---|---|---|
| 1 | 0 | 1 | 2 | 3 | 4 | 5 | 6 | 7 | 8 | 9 | 10/j/q/k |
| | A | 11 | 12 | 13 | 14 | 15 | 16 | 17 | 18 | 19 | 20 |
| 2 | 0 | 1 | 2 | 3 | 4 | 5 | 6 | 7 | 8 | 9 | 10/j/q/k |
| | A | 11 | 12 | 13 | 14 | 15 | 16 | 17 | 18 | 19 | 20 |
| 3 | 0 | 1 | 2 | 3 | 4 | 5 | 6 | 7 | 8 | 9 | 10/j/q/k |
| | A | 11 | 12 | 13 | 14 | 15 | 16 | 17 | 18 | 19 | 20 |
| 4 | 0 | 1 | 2 | 3 | 4 | 5 | 6 | 7 | 8 | 9 | 10/j/q/k |
| | A | 11 | 12 | 13 | 14 | 15 | 16 | 17 | 18 | 19 | 20 |

Bet Amount: 0.25 | 0.5 | 1 | 2 | 3 | 4 | 5 | 10 | 20

Number of games : 1 | 2 | 3 | 4 | 5 | 10 | 20

Bonus Multiplier: yes | no

*Figure 3*

*Pokerpick*

*Step 1:*

*Option A Select your card(s)* ☐ *or Option B select zone to win* ☐

*Select Zone for option B* 1 2 3 4 5 6 7 8 9

*Step 2 if you selected card(s) to win select bet type*

Pick any card ☐

Pick Any 2 cards ☐

Card Box ☐ Games would be the total amount of bets *I.e. 3 cards would be 3 bets 4 cards would be 6 bets.*

Select your cards or QP ☐

| | | | | | | | | | | | | | |
|---|---|---|---|---|---|---|---|---|---|---|---|---|---|
| Diamonds | 2 | 3 | 4 | 5 | 6 | 7 | 8 | 9 | 10 | J | Q | K | A |
| Clubs | 2 | 3 | 4 | 5 | 6 | 7 | 8 | 9 | 10 | J | Q | K | A |
| Hearts | 2 | 3 | 4 | 5 | 6 | 7 | 8 | 9 | 10 | J | Q | K | A |
| Spades | 2 | 3 | 4 | 5 | 6 | 7 | 8 | 9 | 10 | J | Q | K | A |

*Step 3*

Bet Amount 0.25 0.5 1 2 3 4 5 10 20

Number of games: 1 2 3 4 5 10 20

Bonus Multiplier yes no

Rules: *Each zone will be dealt two randomly selected cards and there will be 5 random community cards* zone 1
zone 2
zone 3
zone 4
zone 5
zone 6
zone 7
zone 8
zone 9

C1 C2 C3 C4 c5 if your selected hand beats all the hands in the zone you win the corresponding payout. If there is a tie there is a subordinate payout. Payouts for the card vary according to the chances of winning.

Figure 4C

*HV (horizontal vertical) POKER*

*Step 1:*

*Select bet type*

A. ☐ *Pick a line to win*

B. ☐ *Pick the poker hand that will win*

C. ☐ *Select the line and the hand that will win*

*Step 2: If you selected A use box 1. If you selected B use Box 2. If you selected C use both 1 and 2 or QP* ☐

1 *Select a vertical or horizontal*

| |
|---|
| Horizontal 1 |
| Horizontal 2 |
| Horizontal 3 |
| Horizontal 4 |
| Horizontal 5 |

| | | | | |
|---|---|---|---|---|
| Vertical 1 | Vertical 2 | Vertical 3 | Vertical 4 | Vertical 5 |

2 Select which hand will be the highest: If you selected a line to win only select valid selections for the lines i.e. a straight cannot be in a line with four cards or less.

*High hand* ☐ *Pair 2-10* ☐ *pair J-A* *two pair* ☐ *straight* ☐ *flush* ☐
*Full house* ☐ *four of a kind* ☐ *four aces* ☐ *straight flush* ☐ *royal flush* ☐ *Five of a kind* ☐

*Step 3*

| Bet Amount | 0.25 | 0.5 | 1 | 2 | 3 | 4 | 5 | 10 | 20 |
|---|---|---|---|---|---|---|---|---|---|

| Number of games: | 1 | 2 | 3 | 4 | 5 | 10 | 20 |
|---|---|---|---|---|---|---|---|

| Bonus Multiplier | yes | no |
|---|---|---|

*Payouts vary depending on the selection. Subordinate payout for a tie.*

*Figure 5D*

METHODS, SYSTEMS, AND APPARATUS FOR PLAYING POKER, BLACKJACK AND BACCARAT

CROSS-REFERENCE TO RELATED APPLICATION

This application is a non-provisional Application, for which priority is claimed under 35 U.S.C. § 119, of U.S. Provisional Patent Application No. 61/846,608, filed Jul. 15, 2013, entitled "METHODS, SYSTEMS, AND APPARATUS FOR PLAYING POKER, BLACKJACK AND BACCARAT," the entire contents of the above identified patent application is hereby incorporated by reference in its entirety.

FIELD OF THE INVENTION

The present invention relates generally to a numbers game, more specifically; blackjack, poker or baccarat card games.

BACKGROUND OF THE INVENTION

Card games are a staple of most casinos and played electronically on gaming devices or on client devices, which communicate with servers over a network.

U.S. Pat. Nos. 3,796,433 and 5,257,789 and International Publication No. WO/2004015529 are examples of means of electronic blackjack. U.S. Pat. No. 5,605,334 is an example of an electronic smart system used for keeping track of wagers. U.S. Pat. Nos. 6,581,937 and 7,367,564 are examples of math games where players have no control of the starting variables. U.S. Pat. Nos. 5,823,873, 7,758,411, 4,339,134, 4,380,334 are examples of electronic poker and the methods played therein.

In blackjack, generally the object is to get 21 or have a value that is of greater value than the dealer. Generally the object of poker is to get the highest poker hand possible with some variations like Omaha-high low or Razz the objective is to get the lowest value.

SUMMARY OF INVENTION

The present invention recognizes that, in the current variations of the aforementioned games, a player has no control of the starting hand. Many players fold and surrender all or a portion of their initial wager if they do not like their starting hand.

The present invention solves these and other problems by giving a player more excitement and options by allowing players the option of pre-determining the starting variables with payouts that are in general correspondence with their selection(s).

In an exemplary embodiment, a player selects a starting value(s) S. In the black jack embodiment S can be any value {0-20} and an ace variable is counted as a one or eleven. In baccarat the starting value S is {0-9}. In poker S could be one or a combination of values {A, 2, 3, 4, 5, 6, 7, 8, 9, 10, J, Q, K} with starting suits {hearts, spades, diamond, clubs}.

In these games, a player can 1) play against another player (s) 2) play against gaming operators draw. 3) Play to achieve a predetermined objective. The objective can either be a single variable denoted as X or a parameter objective P that contains plurality of variables.

In an exemplary embodiment, which for purposes of the present invention is identified as "Eighteen Twenty-one or Bust", the objective denoted as P is 18-21 and a single variable objective X is 21. A player can split the bet or place or wager on both the aforementioned options. A gaming operator can choose to offer a plurality parameters not in the preferred embodiment for example: {16-21}, {17-21}, {20-22} {23-25} {16, 18, 21, 25} etc. In this embodiment the preferred variable X is 21 however a gaming operator can make it higher or lower and can choose to allow a player to select a plurality of x objectives: i.e., (21), (22), (29).

If a player achieves the objective(s) X and or P they will be entitled to a payout that is in general correspondence with the possibility of achieving the said objective.

In another exemplary embodiment, which for purposes of the present invention is identified as "compound blackjack" or "grand slam blackjack" and "compound baccarat" or "grand slam baccarat" a player can play multiple hands n with the objective of winning all of the hands. If a player would achieve the objective they will be entitled to a payout that would correspond to the frequency of winning. For example, a player would select a starting variable S for four games and if the player reaches the objective for all their hands they would be entitled to a payout that corresponds with the possibility of winning that hand.

In grand slam blackjack and baccarat a dealer deals card(s) C. In order to select C a gaming operator can use a single deck, multiple decks, or alter the variables within to and change the chances of achieving the objective. This embodiment can be done concurrently in a single deal or subsequently throughout many games. A gaming operator can also elect to have an objective of winning only a portion of the n games i.e 3 out 4 hands with corresponding payouts if a player reaches their objective.

A gaming operator has the option of selecting a single assembly of cards against multiple player zones. For example, initial bets are placed on S12 and S18 by a player. The first card C is a 4 so the zone with the 18 loses because it was a bust (22), the second card C2 is a 5 so the S 12 would win (21). In another exemplary embodiment, a gaming operator deals a separate assembly of cards to each of the player's zones.

In a further exemplary embodiment, this system can be applied to baccarat where the primary objective x is 9 and the parameter objective is close to 9, i.e. 7-9.

In another exemplary embodiment, which for purposes of the present invention is identified as conversion: a player starts playing regular cards with traditional rules, a player is dealt an initial hand. After viewing the initial hand and/or viewing the hand of the gaming operator, community cards, other players hands, a player has the option of converting the game into one of the embodiments herein. A gaming operator can elect there to be no extra cost to the player or they can charge a fee for the conversion. For example 50% of the wager can be charged for a conversion in blackjack if the dealer is showing an ace.

In another exemplary embodiment, this can be played generally with numbers or symbols that represent numbers. For example, a player selects the numerical objective X {777} and or P {677-777} a player selects from a plurality of possible starting values each value has a generally different possibility of achieving the objective. The gaming operator deals variables to the player that adds, subtracts, multiplies, or divides the players hand value if they achieve the objective(s) the player would be entitled to a payout that is in general correlation with the chances of winning. As a side bet in the exemplary embodiments of the games described herein, the gaming operator has the option of allowing a player to select the numerical value of the cards with a payout that would correspond to the general chances of winning.

In an exemplary poker embodiment, a player selects a single S or a plurality of S's. The objective of the game generally is to obtain a high value poker hand and in some games like "Omaha high low" and "Razz," the objective of the game is to get the lowest value hand.

In another exemplary embodiment, there are community cards that will be randomly selected. There can be zone(s) that will be dealt randomly selected cards. A player can select their own initial cards, e.g., {A, A} {K, K} {A, K, Q,} {2, 7} {2, 8}, or wager that one of the zones with randomly selected variables will win. A player whose hand together with the community cards makes up the highest hand would be entitled to a payout that is in general correspondence with the starting hands probability of winning. If there is a tie, a gaming operator has the option of awarding a subordinate payout.

In another exemplary embodiment, a player can play against other players. For example, one player can choose {A, A} and another {10, 10} and another player a {2, 7}. The player with {A, A} would have to anti the most since that hand combination has the highest chances of winning. The player with {2, 7} would have to anti the least since the chances of that player winning are substantially lower.

In a further exemplary poker embodiment, a player selects from a plurality of P parameters and each parameter contains different quantities of variables. For example, a player can select a zone in which each zone contains a different quantity of cards {1, 2, 3, 4, 5, 6, 7}. This can be a standalone game or played in combination with community cards. The hand with 7 cards would generally be entitled to the lowest payout since it has the highest chances of winning. The parameter with one card would generally be entitled to the highest payout since the chances of winning are substantially lower. The card(s) within the parameters can either be random or predetermined before the gameplay.

Another feature that can be used in the exemplary embodiments described herein is a player can select the gaming operators hand and be entitled to a payout that is in general correspondence to the frequency of winning that hand.

The payouts generally would be in correlation with the frequency or probability of winning. For example, in Blackjack, the odds of getting 21 from an initial starting value A is approximately 1:1.78; so a payout could be up to 1.7. For getting 18-21, the odds are approximately 1:1.2; so a payout could be 1.11. If a player selected the option to win a plurality of games, then the odds of winning, and hence payout, would be based on the probability of winning the plurality of games. For example, if a player selected the objective X as 21 and chose 20 as the initial starting value and the amount of hands n as 4, then the gaming operator uses a separate deck for each subset and the chances would be 1\13*13*13*13 or 1:28,000; so a payout could be 25,000 times the wager amount.

The exemplary embodiments described herein can be played on a table apparatus or be played through an electronic server that uses a central processing unit. With the table game variations, these games can be used in conjunction with an electronic betting interface that is connected to an apparatus that utilizes smart recognition technology so it would be easier for the gaming operator pay the winners.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 3 illustrates a bet sheet, according to an exemplary embodiment of the invention;

FIG. 4C illustrates a bet sheet for a game according to an exemplary embodiment of the invention;

FIG. 5D illustrates a game in which a player wagers that one of the horizontal or vertical rows will have the highest poker hand, according to an exemplary embodiment of the invention.

DETAILED DESCRIPTION OF THE EXEMPLARY EMBODIMENTS OF THE INVENTION

Figure 1A:
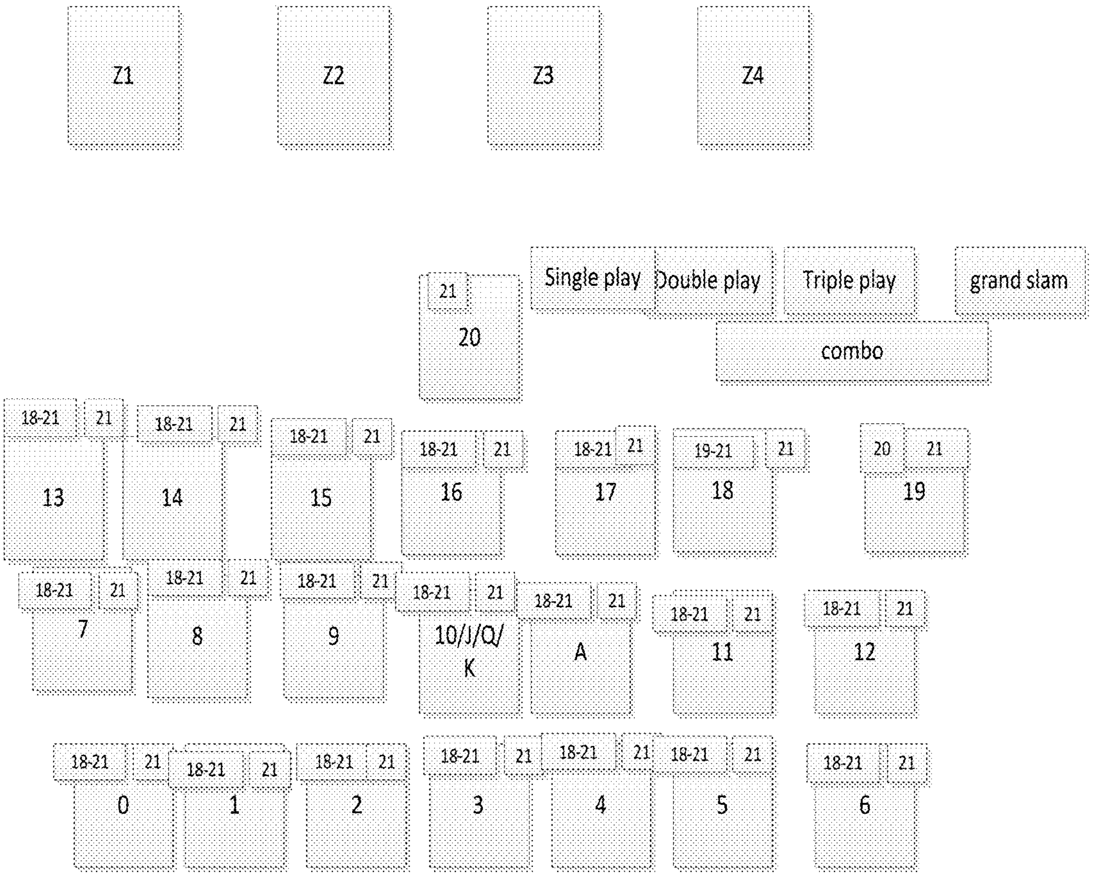
FIG. 1A illustrates a table or digital game board, according to an exemplary embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1A-5D illustrate exemplary embodiments of a numbers game, more specifically, blackjack, poker or baccarat card games.

With reference to FIG. 1A, an example of a table or digital game board will now be described.

1) A player selects (a) starting position(s) S {0-20, A) and selects the objective a) 18-21, b) 21, c) both. Z1, Z2, Z3, Z4 represent gaming zones. A player can choose to play a single game Z or multiple zones. For a single game, the object of the game is to win one game. In Compound/Grand slam Blackjack and baccarat games, a player will wager that they will win a plurality of games.

If a player selects the indicia double, then the Objective of the game is to win two games. If the player selects the triple indicia, then the objective of the game is to win three games. If the player selects the grand slam indicia, then the objective of the game is to win four games. By selecting "combination," a player would combine the Compound Black jack game with a single game option. If a player plays a "double play" with a combination, then that would be three games. If a player plays a "triple play" with combination, then that would be four games. If a player plays a "grand slam" with combination, then that would be five games.

Alternatively, a player can play standard blackjack and has the option of converting to one of the aforementioned options once the card(s) are dealt. The payouts to the player will be in general correspondence to the possibility of winning based on the starting position and/or the number of games selected.

Figure 1B:
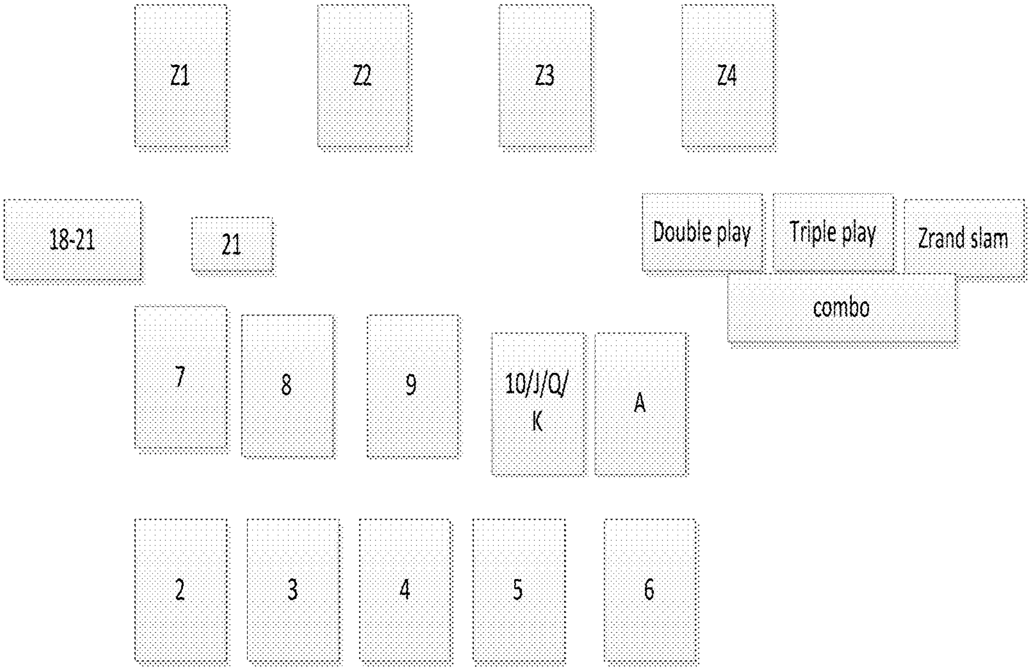
FIG. 1B illustrates a table or digital game board showing how the dealer separates cards into separate zones, according to an exemplary embodiment of the invention.

FIG. 1B illustrates an example alternative to the embodiment of FIG. 1, in which a player has fewer options. These options also can be used for baccarat and poker.

Figure 2A:
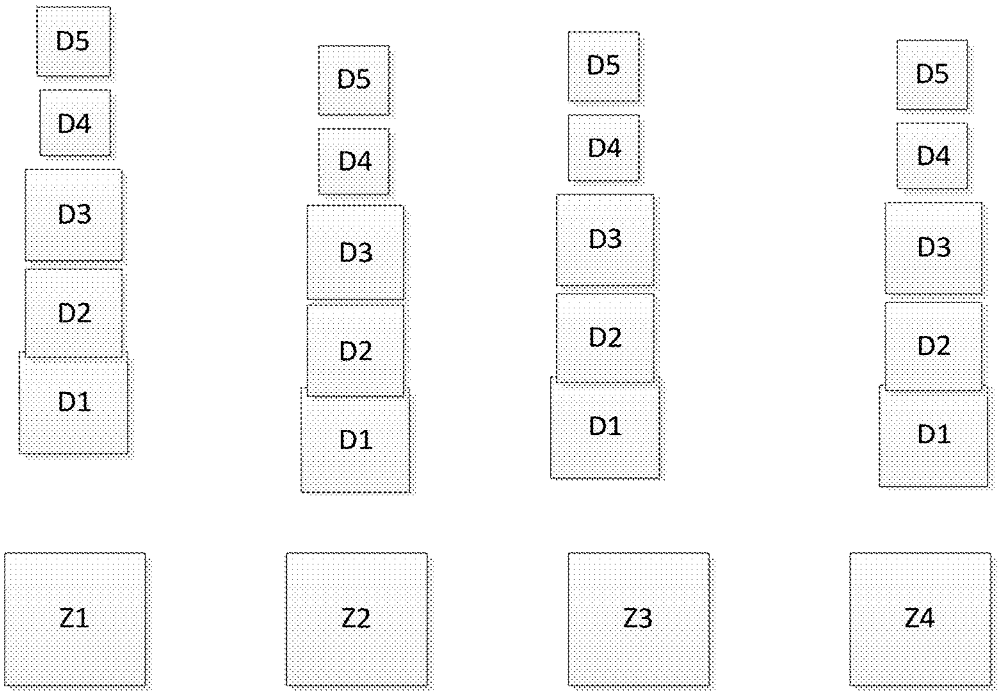
FIG. 2A illustrates cards dealt by a dealer to separate zones, according to an exemplary embodiment of the invention.

FIG. 2A illustrates an exemplary embodiment showing how the dealer deals separate cards to separate zones. In this example, Z represents the player's cards and D represents the cards that are dealt to those zones.

Figure 2B:
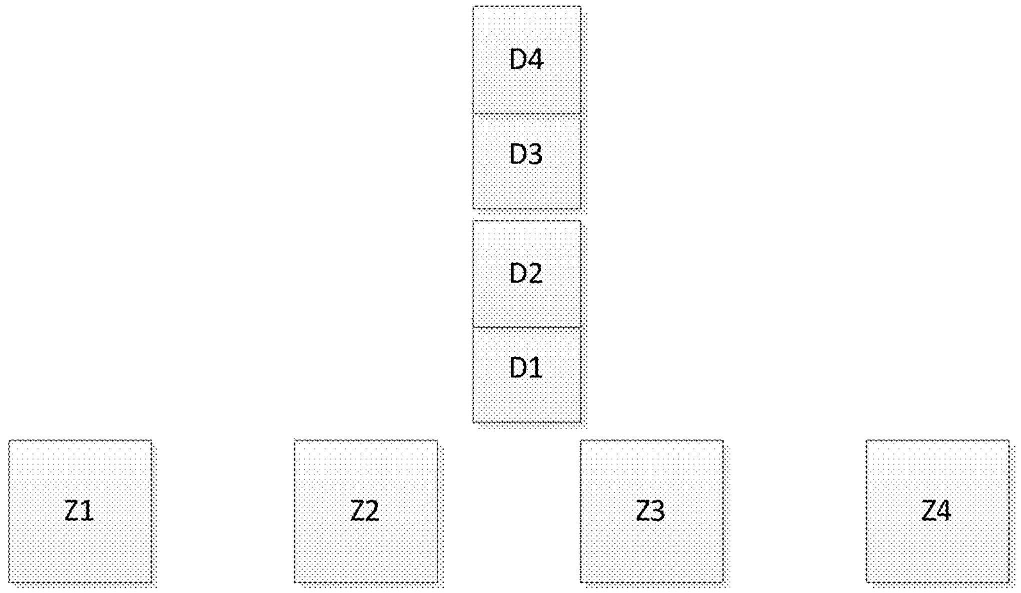
FIG. 2B illustrates an example of an instance in which a single draw assembly is applicable to a plurality of the players zones, according to an exemplary embodiment of the invention.

FIG. 2B illustrates an exemplary embodiment in which a single draw assembly D is applicable to a plurality of the player's zones.

Figure 2C:
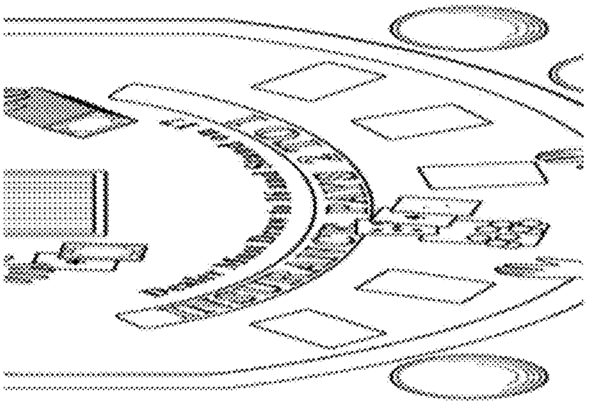
FIG. 2C illustrates a game having house rules in which a player has an option of selecting the starting hand of the dealer, according to an exemplary embodiment of the invention.

FIG. 2C illustrates an exemplary embodiment with house rules, with the exception that a player has the option of selecting the starting hand of the dealer, and if the player wins, the player will be awarded to a payout that corresponds to the odds of winning. In this example embodiment, the options are 17 through 20 for a dealer starting hand, with the 20 starting hand having the highest payout to a player and the 17 the lowest. However, a gaming operator can expand the options to include dealer starting hands of less than 17 where the dealer could be required to play with house rules.

FIG. 3 illustrates an exemplary embodiment of a bet sheet for compound blackjack. In this example, a player selects the objective: 18-21, 21, or a split bet. The player selects how many zones they want to play: e.g., 1, 2, 3, or 4. The player selects if they want to play regular blackjack or compound blackjack. In this example embodiment, both the 21 objective option and the 18-21 objective option are combined in a single sheet. To simplify the options for players, a gaming operator can create two separate bet sheets for the separate objectives. A gaming operator also can reduce the variables or the zone options such that there are fewer permutations, hence making it more economical for a gaming operator to develop.

Figure 4A:
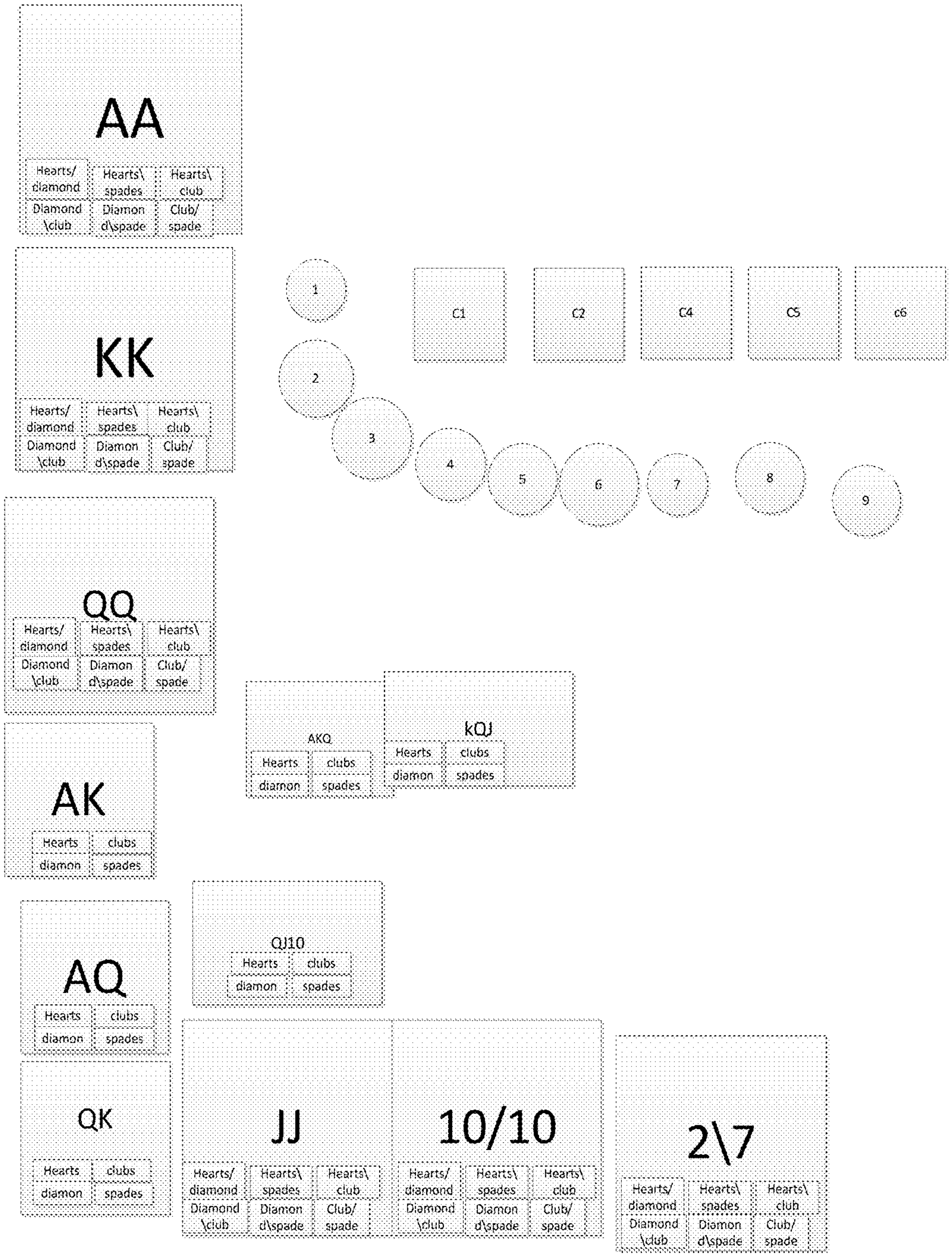
FIG. 4A illustrates a Poker game having community cards, according to an exemplary embodiment of the invention.

FIG. 4A illustrates an example of a Poker embodiment in which the game includes community cards C. The objective of this game is to form the optimal poker hand. The zones marked {1-9} will be dealt random cards to be combined with the community cards dealt. A player can either bet on the zones {1-9} or wager on a predetermined card indicia that will also be combined with the community cards. The payouts will be in general correspondence with the probability of winning based on the starting wager, i.e. the {2, 7} will have the highest payout for a two card selection.

Figure 4B:
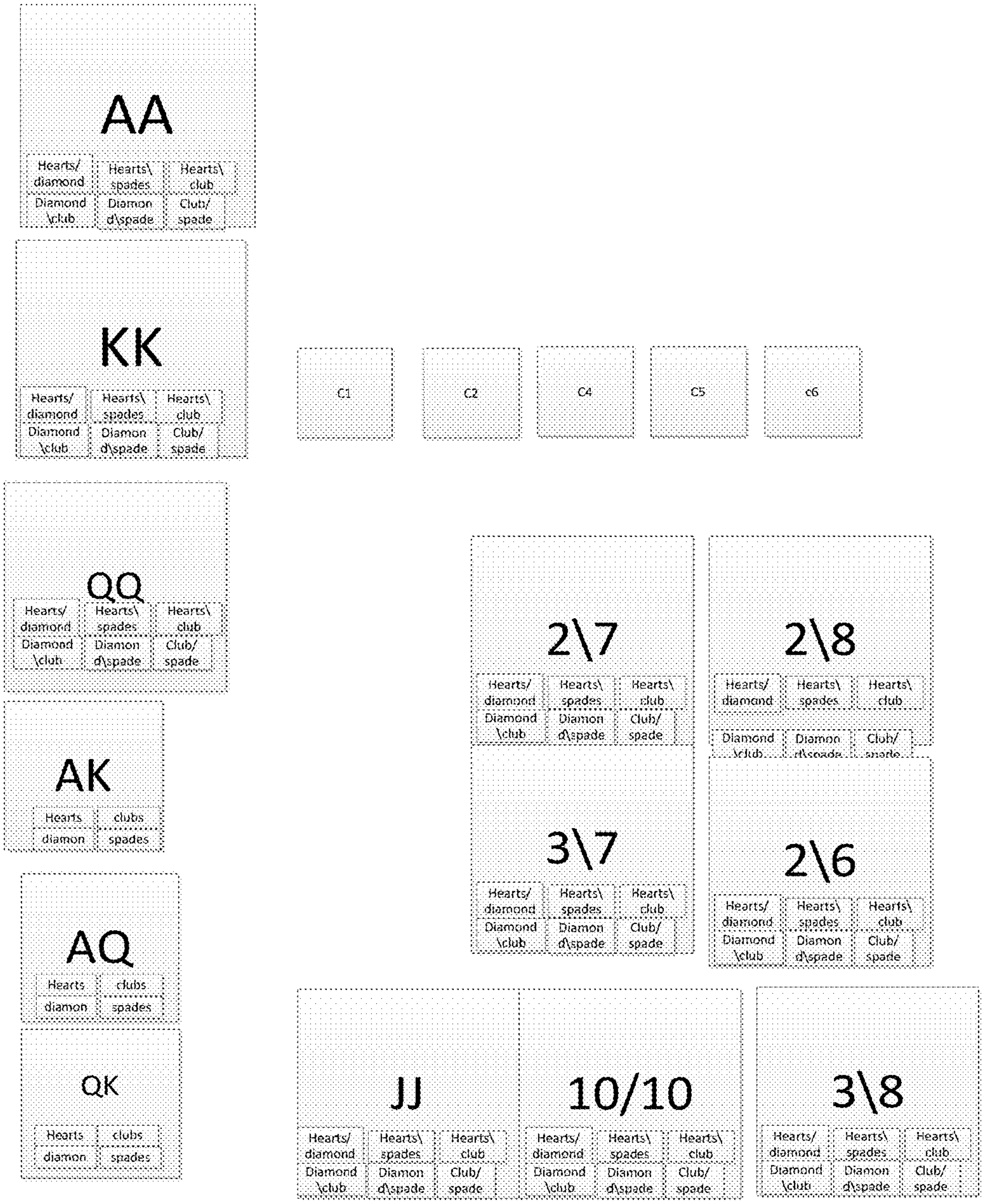
FIG. 4B illustrates a game having predetermined options for the starting hand, according to an exemplary embodiment of the invention.

FIG. 4B illustrates an exemplary embodiment of a game with predetermined options for the starting hand. A player can select their own starting hand or select the hand of the gaming operator. A player can play amongst other players or against the gaming operator. The payouts can be in general correspondence with the odds of winning. When players play amongst themselves, the players with the higher value initial hand would ante more and the players with the lesser value initial hand would ante less.

FIG. 4C illustrates a bet sheet for the poker variation with three steps. In Step one, a player selects A) (a) card(s) to beat the gaming operator's hand, or B) a specific zone that will have the optimal poker hand in combination with the community cards against the other zones. In step two, if a player selected option A from step 1, then the player will select from three options: A) a single card to beat all the gaming operator's hands; B) two cards to beat all the gaming operator's hands; and C) a Card box, which is a combination of hands to beat the gaming operator's hands. The player selects the cards or selects QP for a random selection. In step three, a player selects the amount of money to wager, the amount of games, and if the player wants a bonus multiplier.

Figure 5A:
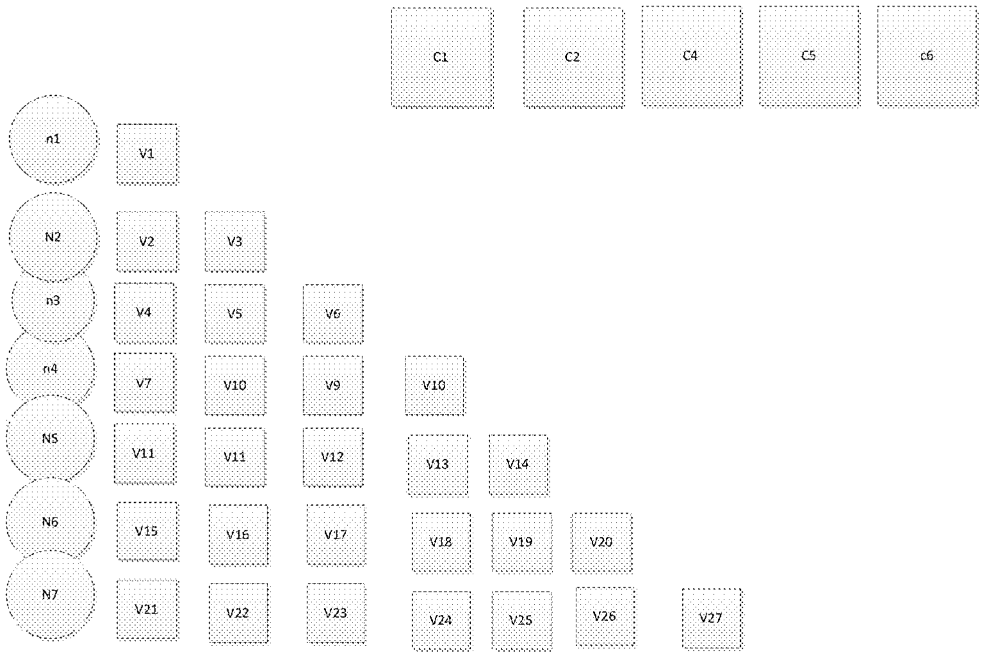
FIG. 5A illustrates a game in which the starting hand variable is the amount of cards, according to an exemplary embodiment of the invention.

FIG. 5A illustrates an exemplary embodiment in which the starting hand variable is the amount of cards, such as {N1, N2, N3, N4, N5, N6, N7}. The player can play to achieve the highest poker hand against the other cards or the highest hand in conjunction with the community cards. N1 generally offers the highest payout and N7 generally offering the lowest payout.

Figure 5B:
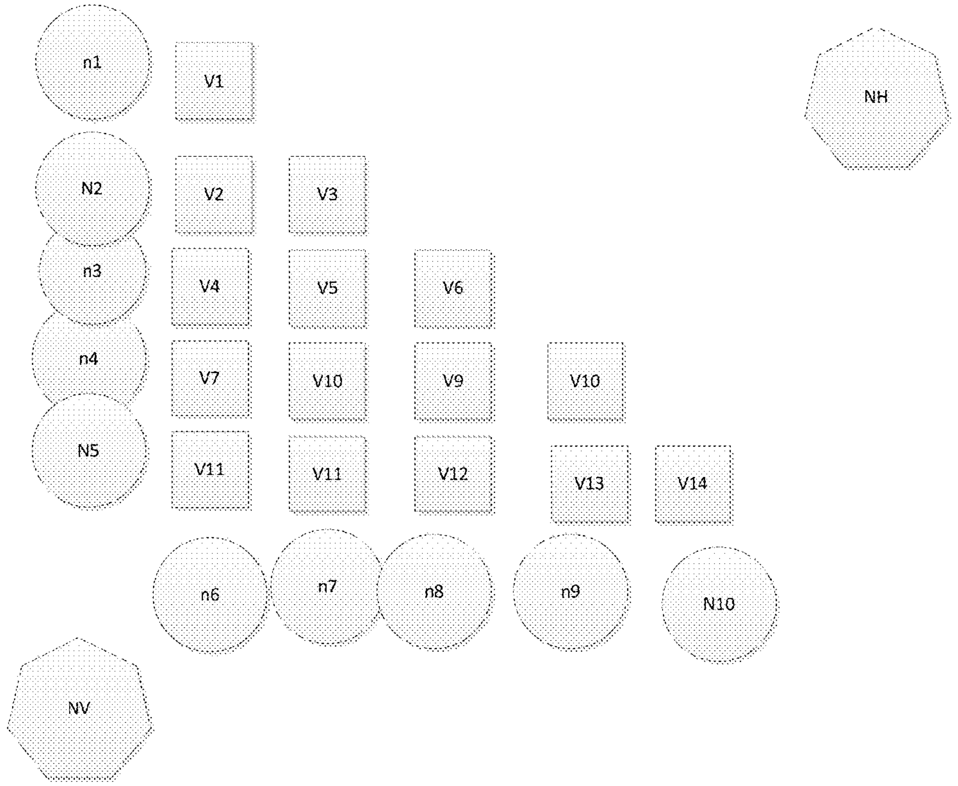
FIG. 5B illustrates a game in which a player bets on N1, N2, N3, N4, N5 in the horizontal or N6, N7, N8, N9, N10 in the vertical, according to an exemplary embodiment of the invention.

FIG. 5B illustrates an alternative exemplary embodiment in which a player bets on N1, N2, N3, N4, N5 in the horizontal or N6, N7, N8, N9, N10 in the vertical. A player also can select to wager if one of the horizontal parameters NH will win or if one of the vertical parameters NV will win.

Figure 5C:
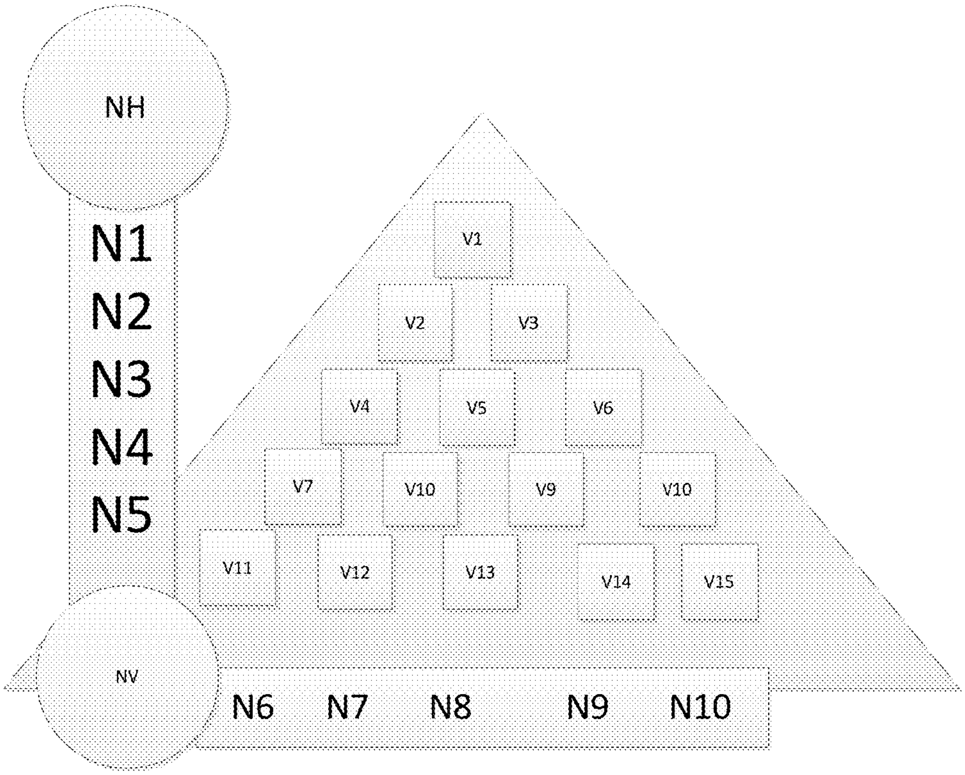
FIG. 5C illustrates a game in which a player wagers that one of the horizontal or vertical rows will have the highest poker hand, according to an exemplary embodiment of the invention.

FIG. 5C illustrates another exemplary embodiment in which a player can wager that one of the horizontal rows, e.g., {N1, N2, N3, N4, N4} will have the highest poker hand, or one of the vertical options will have the highest poker hand {N6, N7, N8, N9, N10}. In the bottom selection, the variables included are all the rows above so:

N6=v11+(v1, v2, v3, v4, v5, v6, v7, v8, v9, v10}
N7=v12+(v1, v2, v3, v4, v5, v6, v7, v8, v9, v10}
N8=v13+(v1, v2, v3, v4, v5, v6, v7, v8, v9, v10}
N9=v14+(v1, v2, v3, v4, v5, v6, v7, v8, v9, v10}
N10=v11+(v1, v2, v3, v4, v5, v6, v7, v8, v9, v10}.

For N1, if there is a tie a gaming operator has the option of making it the sole winner or there can be a plurality of winners or a subordinate payout. This variation can also be used with letters, symbols, and numbers for word and matching objectives.

FIG. 5D illustrates an exemplary embodiment of a poker bet sheet and can be used for any iteration of poker disclosed herein. The example bet sheet also can be used as a side bet or as an independent game with the blackjack layout for four or five zones. A player selects one of three bets: A) which line will contain the optimal poker hand; B) what the winning hand will be; or C) what the winning hand will be and which line will contain the winning hand.

An exemplary embodiment of the present invention is directed to a method for playing blackjack and baccarat including providing a player the opportunity to select a plurality of "S" starting position variables. There is a primary objective P that represents (a) numerical value(s). The payout to the player will be in general correspondence with the probability of the starting value S achieving the objective P.

In an example, S is 0-20. In another example, S can have a plurality of values.

In another example, the game can include an additional objective of winning a plurality of games with a payout that is in general correspondence with the probability of winning the plurality of games.

In yet another example, a player starts off playing blackjack selecting no initial starting position and has the option of converting the deal hand into a starting position S with the a payout that is in general correspondence with the chances of achieving the objective P.

In an example, an initial staring position can be the number of cards. In another example, S is the gaming operator's hand. In another exemplary embodiment, the game is executed through an electronic server.

An exemplary embodiment of the present invention is directed to a gaming apparatus for playing blackjack and baccarat that provides a player the opportunity of selecting a plurality of "S" starting position variables. In this game, there is a primary objective P that represents (a) numerical value(s). The payout to the player is in general correspondence with (i.e., substantially corresponds to) the probability of the starting value S achieving the objective P.

Yet another exemplary embodiment of the present invention is directed to a method of playing poker in which a player selects the initial starting variable(s) S with the primary objective of achieving the optimal poker hand against an opponent's hand. The payout to the player is in general correspondence with the chances of the starting value S achieving the optimal poker hand.

In an example, S can be the amount of cards. In another example, S can be the gaming operator's initial hand. In yet another example, S can be the player's initial hand. In another example, the game is played against other players with initial antes that are in general correspondence with the chances of winning.

An exemplary embodiment of the present invention is directed to a method of playing poker above that is executed through an electronic server.

Yet another exemplary embodiment of the present invention is directed to a gaming apparatus for playing poker in which a player selects the initial starting variable(s) S with the primary objective of achieving the optimal poker hand against an opponent's hand. The payout to the player will be in general correspondence with the probability of the starting value S achieving the optimal hand.

Another exemplary embodiment of a gaming apparatus for playing blackjack and baccarat, includes a controller programmed to provide a player an opportunity to select a plurality of starting position variables "S", with an objective P that represents one or more numerical values, wherein the payout to the player substantially corresponds to a probability of the starting value S achieving the objective P.

Another exemplary embodiment of a gaming apparatus for playing poker, includes a controller programmed to control a game in which a player selects one or more initial starting position variables S with an objective of achieving an optimal poker hand against an opponent's hand, wherein the payout to the player substantially corresponds to a probability of the initial starting position variable S achieving the optimal poker hand.

One of ordinary skill in the art will recognize that other exemplary embodiments of a gaming apparatus can be provided with a controller programmed to control one or more of the embodiments of the games described herein. The gaming apparatus is not limited to any particular apparatus and can include, for example, a personal or public apparatus, computer, notebook, or tablet, an apparatus accessible by another apparatus over a local network connection or global network connection, such as the Internet, an apparatus in a casino or the like, an apparatus requiring payment from a player, etc.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

I claim:

1. A method of playing multi-zone blackjack on an electronic gaming device, the method comprising:

providing an electronic gaming device having a wager input device that accepts vouchers and physical currency, a central processing unit, and a controller, wherein the controller controls an electronic game of multi-zone blackjack, wherein the electronic game of multi-zone blackjack includes at least two zones, the at least two zones each having a starting position variable "S";

initiating the game via the processor on the electronic gaming device, the game involving:

selecting the value of each starting position variable "S" in each of the at least two zones, the starting position variable "S" represented via a blackjack card;

receiving via a processor a wager amount from the player;

adding subsequent additional blackjack cards to the two or more zones via a processor until the total value of the cards in each of the two or more zones is twenty-one (21) or greater than twenty-one (21); and determining via a processor whether the player is entitled to an payout if the player achieves a value of twenty-one (21) in at least one of the two or more zones, wherein the payout to the player substantially corresponds to a probability of the total value of the cards in each of the two or more zones being twenty-one (21) based upon the starting position variable "S".

2. The method of claim 1, wherein the plurality of starting position variables "S" includes 0-20.

3. The method of claim 1, wherein the plurality of starting position variables "S" includes a plurality of values.

4. The method of claim 1, wherein an additional objective is to win a plurality of games with a payout that substantially corresponds with a probability of winning the plurality of games.

5. The method of claim 1, wherein a player starts off playing blackjack selecting no initial starting position and wherein the player has an option of converting a dealt hand into a starting position S with a payout substantially corresponding to chances of achieving the objective P.

6. The method of claim 1, wherein an initial starting position of the plurality of starting position variables "S" is a number of cards.

7. The method of claim 1, wherein a selected starting position of the plurality of starting position variables "S" is a hand of the gaming operator.

8. The method of claim 1, wherein the game is executed through an electronic server.

9. The method of claim 1, wherein the payout increases if the value of twenty-one (21) is achieved in more than two of the two or more zones.

10. The method of claim 9, wherein the payout is a top cumulative payout based upon cumulative amount of twenty-one (21) values achieved.

11. An electronic gaming device for playing multi-zone blackjack, the electronic gaming device comprising:

a wager input device that accepts vouchers and physical currency;

a central processing unit; and a controller programmed to control an electronic game of multi-zone blackjack, wherein the electronic game of multi-zone blackjack includes at least two zones, the at least two zones each having a starting position variable "S", wherein the wager input device provides a player an opportunity to select a value of each starting position variables "S" in each of the at least two zones, the starting position variable "S" represented via a blackjack card, wherein the wager input device accepts a wager amount from the player, wherein additional blackjack cards are added to the two or more zones via a processor until the total value of the cards in each of the two or more zones is twenty-one (21) or greater than twenty-one (21), wherein a payout is awarded to the player via a processor if the player achieves a value of twenty-one (21) in at least one of the two or more zones, and wherein the payout to the player substantially corresponds to a probability of the total value of the cards in each of the two or more zones being twenty-one (21) based upon the starting position variable "S".

12. The electronic gaming device of claim 11, wherein the payout increases if the value of twenty-one (21) is achieved in more than two of the two or more zones.

13. The electronic gaming device of claim 12, wherein the payout is a top cumulative payout based upon cumulative amount of twenty-one (21) values achieved.

14. A method of playing poker on an electronic gaming device, the method comprising:

providing an electronic gaming device having a wager input device that accepts vouchers and physical currency, a central processing unit and a controller, wherein the controller controls an electronic game of poker, wherein the electronic game of poker includes at least two zones, the at least two zones each having two or more initial starting position variables "S" represented by two or more poker cards:

initiating the game via the processor on the electronic gaming device, the game involving:

selecting, via a player using the electronic gaming device, the value of each starting position variable "S" in at least one of the at least two zones with an objective of achieving a winning poker hand against an opponent's poker hand;

receiving via a processor a wager amount from the player;

adding community poker cards via a processor to form poker hands using the two or more poker cards in each zone with the community poker cards; and determining via a processor whether the player is entitled to a payout with the winning poker hand, wherein the payout to the player substantially corresponds to the frequency of the initial starting position variables S winning the optimal poker hand.

15. The method of claim 14, wherein an initial starting position of the one or more initial starting position variables "S" is an amount of cards.

16. The method of claim 14, wherein an initial starting position of the one or more initial starting position variables "S" is an initial hand of a gaming operator.

17. The method of claim 14, wherein an initial starting position of the one or more initial starting position variables "S" is an initial hand of the player.

18. The method of claim 14, wherein the game is played against other players with initial antes that correspond with chances of winning.

19. The method of claim 14, wherein the game is executed through an electronic server.

20. An electronic casino gaming device for playing poker, the device comprising:

a wager input device that accepts vouchers and physical currency; and a central processing unit and controller programmed to control an electronic game of poker, wherein the electronic game of poker includes at least two zones, the at least two zones each having two or more initial starting position variables "S" represented by two or more poker cards, wherein a player, using the wager input device, selects the value of each starting position variable "S" in at least one of the at least two zones with an objective of achieving a winning poker hand against an opponent's poker hand, wherein the device accepts a wager amount from the player, wherein the poker game is played by adding community poker cards selected randomly via a processor to form poker hands using the two or more poker cards in each zone with the community poker cards; and wherein a payout is awarded via a processor to the player with the winning poker hand, wherein the payout to the player substantially corresponds to the frequency of the initial starting position variables S winning the optimal poker hand.

* * * * *